US012691402B2

(12) United States Patent
Nisbet et al.

(10) Patent No.: US 12,691,402 B2
(45) Date of Patent: Jul. 28, 2026

(54) METHOD FOR REMOVING CO₂ FROM A CO₂-CONTAINING STREAM

(71) Applicant: SHELL USA, INC., Houston, TX (US)

(72) Inventors: Timothy Michael Nisbet, Amsterdam (NL); Sayee Prasaad Balaji, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 247 days.

(21) Appl. No.: 18/562,452

(22) PCT Filed: Jun. 10, 2022

(86) PCT No.: PCT/EP2022/065886

§ 371 (c)(1),
(2) Date: Nov. 20, 2023

(87) PCT Pub. No.: WO2022/258827

PCT Pub. Date: Dec. 15, 2022

(65) Prior Publication Data

US 2024/0181381 A1     Jun. 6, 2024

(30) Foreign Application Priority Data

Jun. 11, 2021     (EP) .................................... 21178898

(51) Int. Cl.
*B01D 53/02*          (2006.01)
*B01D 53/00*          (2006.01)
(Continued)

(52) U.S. Cl.
CPC ........... *B01D 53/002* (2013.01); *B01D 53/02* (2013.01); *F25J 1/0027* (2013.01); *F25J 1/0228* (2013.01);
(Continued)

(58) Field of Classification Search
CPC ........ B01D 53/00; B01D 53/02; B01D 53/04; B01D 53/14; B01D 53/62; B01J 41/04;
(Continued)

(56) References Cited

U.S. PATENT DOCUMENTS 4,952,223 A  *  8/1990  Kirshnamurthy ...... F25J 3/0266
                                                              62/928
5,100,635 A      3/1992  Krishnamurthy et al.
(Continued)

OTHER PUBLICATIONS

International Search Report and Written Opinion received for PCT Patent Application No. PCT/E P2022/065886, mailed on Sep. 29, 2022, 09 pages.
(Continued)

*Primary Examiner* — Sharon Pregler
(74) *Attorney, Agent, or Firm* — SHELL USA, INC.

(57)                    ABSTRACT

The present invention relates to a method for removing carbon dioxide (CO₂) from a CO₂-containing stream, the method at least comprising the steps of: a) providing a CO₂-containing stream (10), preferably air wherein the CO₂-containing stream (10) has a CO₂ content in the range of from 10 to 1000 ppmv, preferably from 100 to 1000 ppmv; b) removing CO₂ from the CO₂-containing stream (10) provided in step a) in a first CO₂ removal unit (2), thereby obtaining a first CO₂-enriched stream (30) and a first CO₂-depleted stream (20); c) liquefying the first CO₂-enriched stream (30) obtained in step b) in a liquefaction unit (3); d) removing from the liquefaction unit (3) at least a liquefied CO₂ stream (40) and a gaseous stream (15) containing at least nitrogen [N₂ (g)], oxygen [O₂ (g)] and CO₂ (g).

12 Claims, 3 Drawing Sheets

(51) Int. Cl.
    *F25J 1/00*          (2006.01)
    *F25J 1/02*          (2006.01)

(52) U.S. Cl.
    CPC .... *B01D 2256/22* (2013.01); *B01D 2257/102*
        (2013.01); *B01D 2257/104* (2013.01); *B01D*
           *2258/06* (2013.01); *B01D 2259/40086*
        (2013.01); *F25J 2205/60* (2013.01); *F25J*
                       *2210/40* (2013.01)

(58) Field of Classification Search
    CPC ...... F25J 1/00; F25J 1/02; F25J 3/0266; F25J
                                    3/08
    USPC ......................................................... 95/107
    See application file for complete search history.

(56)                    References Cited

U.S. PATENT DOCUMENTS

| | | |
|---|---|---|
| 9,751,039 B2 | 9/2017 | Gebald et al. |
| 9,975,087 B2 | 5/2018 | Eisenberger |
| 10,421,913 B2 | 9/2019 | Von Olshausen et al. |
| 10,521,880 B2 | 12/2019 | Vembu et al. |
| 2009/0232861 A1* | 9/2009 | Wright ................ B01D 61/445 |
| | | 423/437.1 |

OTHER PUBLICATIONS

Keeling et al., "Exchanges of Atmospheric CO2 and 13-CO2 with
the Terrestrial Biosphere and Oceans from 1978 to 2000. I. Global
Aspects", Scripps Institution of Oceanography, Jun. 1, 2001, 29
pages.

\* cited by examiner

METHOD FOR REMOVING CO$_2$ FROM A CO$_2$-CONTAINING STREAM

CROSS REFERENCE TO RELATED APPLICATIONS

This is a National stage application of International Application No. PCT/EP2022/065886, filed 10 Jun. 2022, which claims priority of European Application No. 21178898.9 filed 11 Jun. 2021 which is incorporated herein by reference in its entirety.

The present invention relates to a method for removing carbon dioxide (CO$_2$) from a CO$_2$-containing stream, in particular dilute sources such as air.

Figure 1:
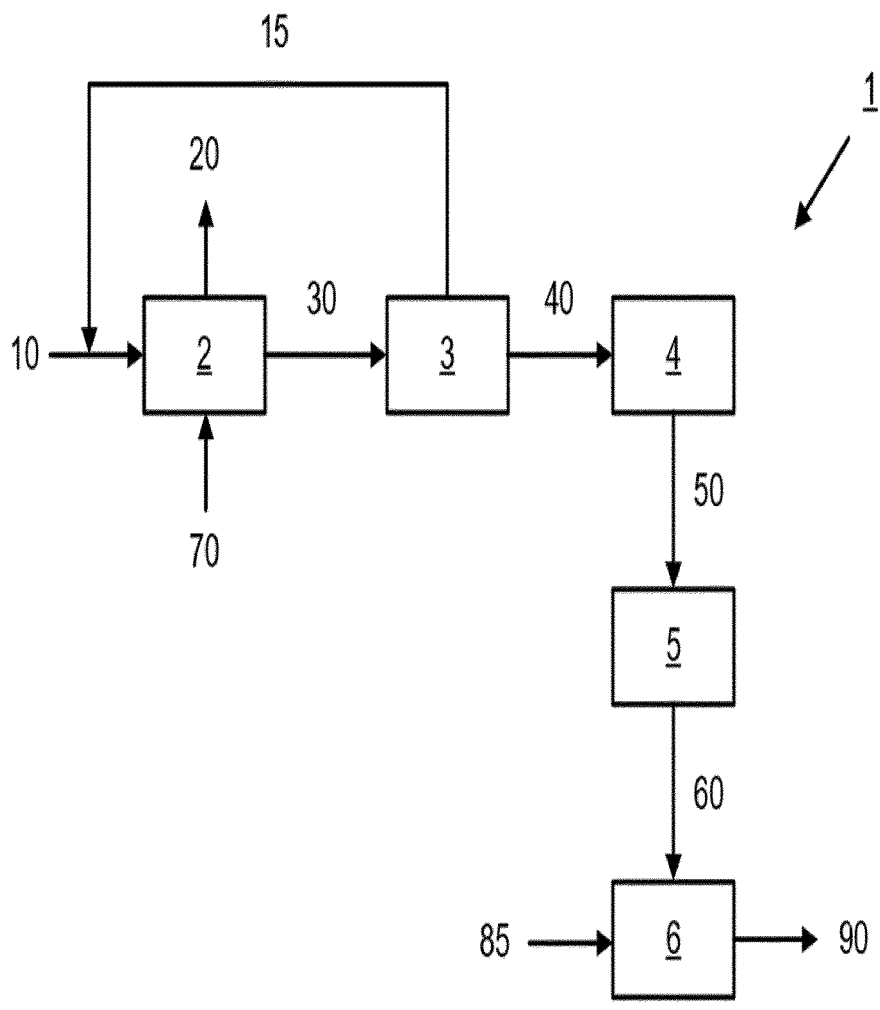

Methods for removing CO$_2$ from a CO$_2$-containing stream such as air are known in the art. As a mere example, U.S. Pat. No. 10,421,913 discloses a method for the production of synthetically produced methane or other hydrocarbons, wherein carbon dioxide is adsorbed from atmosphere and subjected to an exothermic methane- or Fischer-Tropsch synthesis. FIG. 1 of U.S. Pat. No. 10,421,913 discloses a carbon dioxide recovering system in some level of detail. This carbon dioxide recovering system is preferably operated continuously, wherein recovered carbon dioxide is temporarily stored in a buffer storage.

Other example processes are described in EP0469781A2 and U.S. Pat. No. 4,952,223 which disclose methods for CO$_2$ capture from combustion exhaust gases and other waste streams. These methods typically capture CO$_2$ from inlet streams that have higher concentrations of CO$_2$ and lower concentrations of oxygen, e.g., less than 10 volume %. These processes do not address the problem of capturing CO$_2$ from very dilute sources such as air where the concentration of CO$_2$ is much lower than combustion exhaust gases and waste streams and the oxygen content is higher than 10 volume %, typical around 21 volume %.

A problem of the above and other methods for removing CO$_2$ from air is that the used systems do not arrange for removing entrained air from the CO$_2$ product.

A further problem is that if the CO$_2$ is purified in a downstream process, the carbon dioxide is not recovered from the air to its fullest extent.

An even further problem is that buffer storage of CO$_2$ product (as done in the above-mentioned U.S. Pat. No. 10,421,913) is very expensive, if sufficient volume is required to allow intermittent operation of the CO$_2$ removal step.

It is an object of the present invention to minimize one or more of the above problems.

It is a further object of the present invention to provide a simple method for removing CO$_2$ from air, wherein the carbon dioxide is recovered to a fuller extent.

One or more of the above or other objects can be achieved by providing a method for removing carbon dioxide (CO$_2$) from a CO$_2$-containing stream, the method at least comprising the steps of:

a) providing a CO$_2$-containing stream, preferably air, wherein the CO$_2$-containing stream (10) has a CO$_2$ content in the range of from 10 to 1000 ppmv, preferably from 100 to 1000 ppmv;

b) removing CO$_2$ from the CO$_2$-containing stream provided in step a) in a first CO$_2$-removal unit, thereby obtaining a first CO$_2$-enriched stream and a first CO$_2$-depleted stream;

c) liquefying the first CO$_2$-enriched stream obtained in step b) in a liquefaction unit;

d) removing from the liquefaction unit at least a liquefied CO$_2$ stream and a gaseous stream containing at least nitrogen [N$_2$ (g)], oxygen [O$_2$ (g)] and CO$_2$ (g).

It has surprisingly been found according to the present invention that CO$_2$ can be removed from air in a surprisingly simple manner and can be concentrated to levels beyond 90 vol. %, even beyond 95 vol. % or even beyond 99 vol. %.

A further advantage of the present invention is that CO$_2$ can be recovered in a non-continuous manner.

Another advantage of the present invention is that there are low CO$_2$ losses during purification.

A further advantage of the present invention is that there is no requirement of a gaseous buffer for the intermediate storage of CO$_2$.

In step a) of the method according to the present invention a CO$_2$-containing stream, preferably air, is provided. In general, it is well known that air comprises of constituents such as nitrogen, oxygen, carbon dioxide, hydrogen, helium, argon, methane, krypton. Air also comprises of water vapour. Typical concentrations of nitrogen, oxygen, argon in dry air are 78.08 vol. %, 20.95 vol. % and 0.93 vol. % respectively (Haynes, W. M., Lide, D. R., & Bruno, T. J. (Eds.), Chapter 14-3, 2016, CRC Handbook of Chemistry and Physics (97th ed.), CRC Press). The concentration of carbon dioxide in air has steadily increased from around 310 ppmv in 1960 to 420 ppmv in 2022 (C. D. Keeling, S. C. Piper, R. B. Bacastow, M. Wahlen, T. P. Whorf, M. Heimann, and H. A. Meijer, Exchanges of atmospheric CO$_2$ and 13-CO$_2$ with the terrestrial biosphere and oceans from 1978 to 2000. I. Global aspects, SIO Reference Series, No. 01-06, Scripps Institution of Oceanography, San Diego, 88 pages, 2001). It is expected that the concentration of CO$_2$ in air will increase unless mitigated. For all practical purposes, the present invention is applicable with any anticipated increase or decrease in the concentration of CO$_2$ in the air. In an embodiment of the present invention, one of ordinary skill in the art will readily understand that the CO$_2$-containing stream is not particularly limited and may come from various sources. The CO$_2$-containing stream may comprise less than 10 vol. % CO$_2$, preferably less than 5 vol. % CO$_2$, more preferably less than 2 vol. % CO$_2$. The remainder of the CO$_2$-containing stream may comprise one or more of nitrogen, oxygen, water vapour, argon.

According to a preferred embodiment of the present invention, the CO$_2$-containing stream provided in step a) may be air, and the CO$_2$-containing stream may have a CO$_2$ content in the range of from 10 to 1000 ppmv, preferably from 100 to 1000 ppmv.

In step b) of the method according to the present invention, CO$_2$ is removed from the CO$_2$-containing stream provided in step a) in a first CO$_2$-removal unit, thereby obtaining a first CO$_2$-enriched stream and a first CO$_2$-depleted stream.

As the person skilled in the art is familiar with such CO$_2$-removal units, these are not discussed here in detail. Examples of such CO$_2$-removal units are adsorption units (e.g. as described in U.S. Pat. No. 10,521,880 B2, U.S. Pat. Nos. 9,975,087, 9,751,039 B2, the above-mentioned U.S. Pat. No. 10,421,913, etc.). Preferably, the CO$_2$-removal unit comprises a CO$_2$ adsorption unit. By adjusting the operating parameters of the first CO$_2$-removal unit, the conditions of the first CO$_2$-enriched stream and the first CO$_2$-depleted stream such as, but not limiting to, concentration of CO$_2$ and pressure are determined.

Preferably, the first CO$_2$-enriched stream obtained in step b) has a CO$_2$ content (excluding water) of at least 60 vol. %, preferably at least 80 vol. %, more preferably at least 90 vol.

%. Typically, the first $CO_2$-enriched stream obtained in step b) has a $CO_2$ content of at most 99.5 vol. %, preferably at most 98.5 vol. %, more preferably at most 95 vol. %.

Typically, the first $CO_2$-depleted stream obtained in step b) has a $CO_2$ content of at most 200 ppmv.

According to a preferred embodiment of the method according to the present invention, the first $CO_2$-enriched stream obtained in step b) has a pressure of 0.5 to 1.5 bara, preferably from 0.9 to 1.1 bara.

In step c) of the method according to the present invention, the first $CO_2$-enriched stream obtained in step b) is liquefied in a liquefaction unit.

The liquefaction unit is not particularly limited. As the person skilled in the art is familiar with such liquefaction units, these are not discussed here in detail. Typically, such a liquefaction unit contains a compressor, an expansion valve and a gas/liquid separation unit along with optional heat exchangers. Other liquefaction units may also contain a compressor, a refrigeration chiller, optional heat exchangers and a gas/liquid separation unit.

In step d) of the method according to the present invention, at least a liquefied $CO_2$ stream and a gaseous stream containing at least nitrogen [$N_2$ (g)], oxygen [$O_2$ (g)] and $CO_2$ (g) are removed from the liquefaction unit. Typically, the gaseous stream containing at least $N_2$ (g), $O_2$ (g) and $CO_2$ (g) is removed from a gas/liquid separator forming part of the liquefaction unit. Typically, the gaseous stream containing at least $N_2$ (g), $O_2$ (g) and $CO_2$ (g) as removed from the liquefaction unit has a $CO_2$ content of at least 40 vol. %, preferably at least 50 vol. %.

According to an especially preferred embodiment of the present invention, at least a part of the gaseous stream removed in step d) is combined with the $CO_2$-containing stream provided in step a).

In this way, the capture of $CO_2$ can be further improved (instead of venting it into the atmosphere).

Further it is preferred that, alternatively or additionally, at least a part of the gaseous stream removed in step d) is separated in a second $CO_2$ removal unit, thereby obtaining a second $CO_2$-enriched stream and a second $CO_2$-depleted stream, wherein the second $CO_2$-enriched stream is combined with the first $CO_2$-enriched stream. In general, one of skill in the art is familiar with such $CO_2$ removal units, these are not discussed here in detail. By adjusting the operating parameters of the second $CO_2$-removal unit, the conditions of the second $CO_2$-enriched stream and the second $CO_2$-depleted stream such as, but not limiting to, concentration of $CO_2$ is determined. Preferably, the second $CO_2$-enriched stream has a $CO_2$ content (excluding water) of at least 90 vol. %, preferably at least 95 vol. %. Typically, the second $CO_2$-depleted stream has a $CO_2$ content of at most 30 vol. %.

Furthermore, it is preferred that, alternatively or additionally, at least a part of the gaseous stream removed in step d) is used as a sweep gas in the $CO_2$ removal unit of step b).

The person skilled in the art will understand that the liquefied $CO_2$ stream removed from the liquefaction unit can be used in various ways.

Preferably, the liquefied $CO_2$ stream removed in step d) is used in a conversion process, sequestration or transport (e.g. by pipeline or ship), after optional storage and pumping. The conversion process can be selected from a broad range of processes such as RWGS (reverse water gas shift), methanation, methanol synthesis, etc. As the person skilled in the art is familiar with these conversion processes as such, these are not discussed here in detail.

Figure 2:
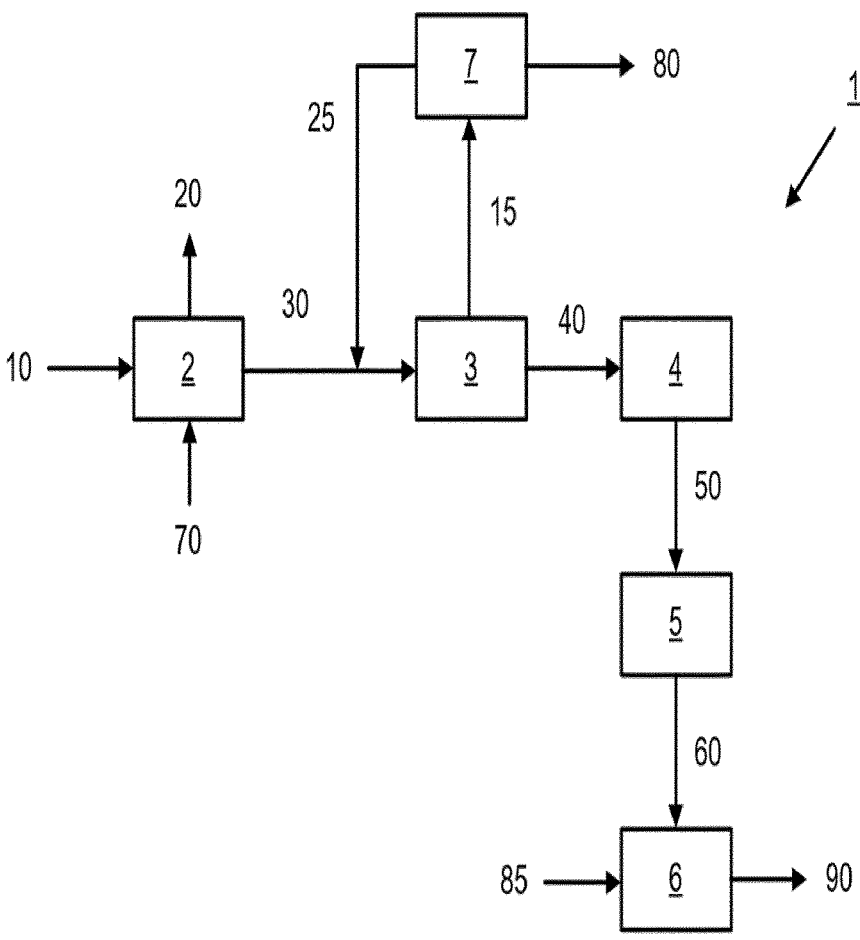
Figure 3:
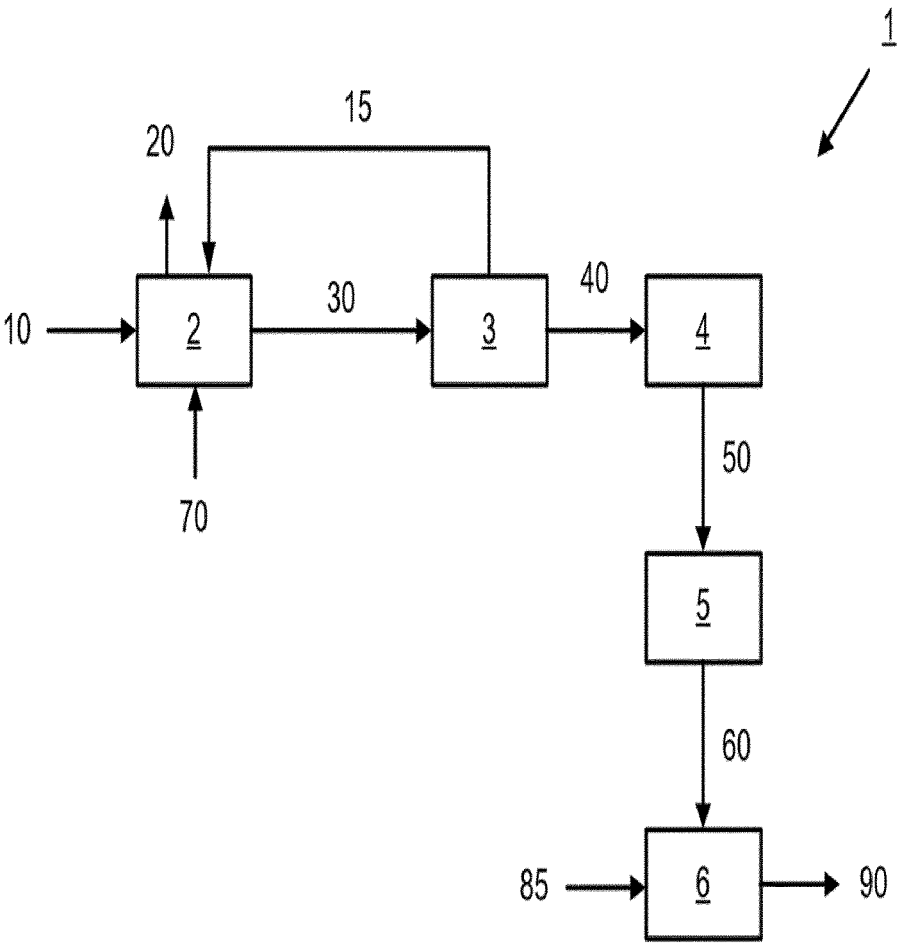

Hereinafter the present invention will be further illustrated by the following non-limiting drawings. Herein shows:

FIG. 1 schematically a flow scheme of a first embodiment of a method for removing $CO_2$ from a $CO_2$-containing stream according to the present invention; and FIG. 2 schematically a flow scheme of a second embodiment of a method for removing $CO_2$ from a $CO_2$-containing stream according to the present invention; and FIG. 3 schematically a flow scheme of a third embodiment of a method for removing $CO_2$ from a $CO_2$-containing stream according to the present invention.

For the purpose of this description, same reference numbers refer to same or similar components.

The flow scheme of FIG. 1, generally referred to with reference number 1, comprises a first $CO_2$-removal unit 2, a $CO_2$ liquefaction unit 3, a liquid $CO_2$ storage unit 4, a $CO_2$ pump 5, and a $CO_2$ conversion unit 6.

During use of the flow scheme of FIG. 1, a $CO_2$-containing stream 10 (preferably air) is provided.

In a first $CO_2$-removal unit 2, e.g. in the form of a $CO_2$ adsorption unit, $CO_2$ is removed from the $CO_2$-containing stream 10, thereby obtaining a first $CO_2$-enriched stream 30 and a first $CO_2$-depleted stream 20. In the embodiment of FIG. 1, steam stream 70 is used as a sweep gas (to desorb $CO_2$ as adsorbed in the $CO_2$ adsorption unit 2).

The first $CO_2$-enriched stream 30 is then liquefied in the liquefaction unit 3. From the liquefaction unit 3 at least a liquefied $CO_2$ stream 40 and a gaseous stream 15 are removed. The gaseous stream 15 contains at least $N_2$ (g), oxygen $O_2$ (g) and $CO_2$ (g).

The liquefied $CO_2$ stream 40 is used in a $CO_2$ conversion process performed in the $CO_2$ conversion unit 6, after optional storage in liquid $CO_2$ storage unit 4 (from which it is pumped as liquid stream 50,60 by $CO_2$ pump 5 to the $CO_2$ conversion unit 6). The $CO_2$ conversion process in the $CO_2$ conversion unit 6 along with any other reactants (shown as stream 85) as required by the conversion process) results in a products stream 90.

Instead of converting the liquefied $CO_2$ stream 40, it can also be used for sequestration or transport (e.g. by pipeline or ship).

As shown in the embodiment of FIG. 1, at least a part of the gaseous stream 15 is combined with the $CO_2$-containing stream 10. This surprisingly allows that a higher $CO_2$ recovery from the $CO_2$-containing stream 10 is achieved, without adding complexity to the system.

FIG. 2 and FIG. 3 show schematically alternative embodiments of methods for removing $CO_2$ from a $CO_2$-containing stream according to the present invention. It goes without saying that the embodiments of FIGS. 1-3 may be combined in any way.

In the embodiment of FIG. 2, a second $CO_2$ removal unit 7 is present. At least a part of the gaseous stream 15 is separated in the second $CO_2$ removal unit 7, thereby obtaining a second $CO_2$-enriched stream 25 and a second $CO_2$-depleted stream 80, wherein the second $CO_2$-enriched stream is combined with the first $CO_2$-enriched stream 30.

In the embodiment of FIG. 3, at least a part of the gaseous stream 15 is used as a sweep gas in the $CO_2$ removal unit 2.

EXAMPLES

Example 1

The flow scheme of FIG. 1 was used for illustrating an exemplary method according to the present invention. The compositions and conditions of the streams in the various flow lines are provided in Table 1 below.

The values in Table 1 were calculated using a model generated with commercially available UniSim software, whilst using standard thermodynamic fluid packages with settings such that $CO_2$ removal processes and $CO_2$ liquefaction processes are simulated.

The obtained $CO_2$ content of the first $CO_2$-enriched stream 30 was 90 vol. % and of the liquefied $CO_2$ stream 40 was 99.7 vol. %.

The total $CO_2$ recovery was defined as the ratio of moles of $CO_2$ in the liquefied $CO_2$ stream 40 to the moles of $CO_2$ in the $CO_2$-containing stream 10; a total $CO_2$ recovery of 58% was obtained.

TABLE 1

| stream | 10 | 15 | 20 | 30 | 40 | 50 | 60 |
|---|---|---|---|---|---|---|---|
| T [° C.] | 20 | 40 | 20 | 20 | −31 | −31 | −31 |
| p [bara] | 1.0 | 15 | 1.0 | 1.0 | 15 | 15 | 60 |
| Molar flow [kg · mol/hr] | 4.3 × $10^5$ | 79 | 4.3 × $10^5$ | 179 | 100 | 100 | 100 |
| $CO_2$ [vol. %] | 0.04 | 77.9 | 0.02 | 90.0 | 99.7 | 99.7 | 99.7 |
| $O_2$ [vol. %] | 20.64 | 6.5 | 20.64 | 3.0 | 0.2 | 0.2 | 0.2 |
| $N_2$ [vol. %] | 76.92 | 15.6 | 76.92 | 7.0 | 0.1 | 0.1 | 0.1 |
| $H_2O$ [vol. %] | 1.48 | — | 1.48 | — | — | — | — |
| Ar [vol. %] | 0.92 | — | 0.92 | — | — | — | — |

Example 2 (Comparative)

For comparison with FIG. 1, and using the same UniSim software, the method of FIG. 1 but without recycling stream 15 to stream 10 was simulated. The compositions and conditions of the streams in the various flow lines are provided in Table 2 below. The total $CO_2$ recovery in this case was 42%.

TABLE 2

| stream | 10 | 15 | 20 | 30 | 40 | 50 | 60 |
|---|---|---|---|---|---|---|---|
| T [° C.] | 20 | 40 | 20 | 20 | −31 | −31 | −31 |
| p [bara] | 1.0 | 15 | 1.0 | 1.0 | 15 | 15 | 60 |
| Molar flow [kg · mol/hr] | 5.9 × $10^5$ | 79 | 5.9 × $10^5$ | 179 | 100 | 100 | 100 |
| $CO_2$ [vol. %] | 0.04 | 77.9 | 0.01 | 90.0 | 99.7 | 99.7 | 99.7 |
| $O_2$ [vol. %] | 20.64 | 6.5 | 20.64 | 3.0 | 0.2 | 0.2 | 0.2 |
| $N_2$ [vol. %] | 76.92 | 15.6 | 76.94 | 7.0 | 0.1 | 0.1 | 0.1 |
| $H_2O$ [vol. %] | 1.48 | — | 1.48 | — | — | — | — |
| Ar [vol. %] | 0.92 | — | 0.92 | — | — | — | — |

As can be seen from Tables 1 and 2, the exemplary method of FIG. 1 (with recycle) has a higher $CO_2$ recovery (58%) than the one without recycle (viz. 42%). Comparison of flow rates of stream 10 in Tables 1 and 2 indicate that recycling the gaseous stream 15 (containing at least $N_2$ (g), $O_2$ (g) and $CO_2$ (g)) as removed from the liquefaction unit 3 to the feed stream 10 reduces the total flow of the $CO_2$-containing stream 10, thereby increasing efficiency of the present invention.

DISCUSSION

As can be seen from the above Figures and Examples, the method according to the present invention allows for a surprisingly simple and effective way of increasing $CO_2$ recovery and purity from a $CO_2$-containing stream, without adding complexity to the system. According to the present invention, $CO_2$ concentrations of at least 90 vol. % can be achieved, and even as high as above 99 vol. %.

The person skilled in the art will readily understand that many modifications may be made without departing from the scope of the invention.

We claim:

1. A method for removing carbon dioxide ($CO_2$) from a $CO_2$-containing stream, the method at least comprising the steps of:
   a) providing a $CO_2$-containing stream, wherein the $CO_2$-containing stream has a $CO_2$ content in the range of from 10 to 1000 ppmv;
   b) removing $CO_2$ from the $CO_2$-containing stream provided in step a) in a first $CO_2$-removal unit, thereby obtaining a first $CO_2$-enriched stream and a first $CO_2$-depleted stream;
   c) liquefying the first $CO_2$-enriched stream obtained in step b) in a liquefaction unit;
   d) removing from the liquefaction unit at least a liquefied $CO_2$ stream and a gaseous stream containing at least nitrogen, oxygen and $CO_2$,
   wherein at least a part of the gaseous stream removed in step d) is combined with the $CO_2$-containing stream provided in step a), and
   wherein the $CO_2$-containing stream is air.

2. The method according to claim 1, wherein the first $CO_2$-enriched stream obtained in step b) has a $CO_2$ content (excluding water) of at least 60 vol. %.

3. The method according to claim 1, wherein the first $CO_2$-enriched stream obtained in step b) has a pressure of 0.5 to 1.5 bara.

4. The method according to claim 1, wherein at least a part of the gaseous stream removed in step d) is separated in a second $CO_2$ removal unit, thereby obtaining a second $CO_2$-enriched stream and a second $CO_2$-depleted stream, wherein the second $CO_2$-enriched stream is combined with the first $CO_2$-enriched stream.

5. The method according to claim 4, wherein the second $CO_2$-enriched stream has a $CO_2$ content (excluding water) of at least 90 vol. %.

6. The method according to claim 1, wherein at least a part of the gaseous stream removed in step d) is used as a sweep gas in the $CO_2$ removal unit of step b).

7. The method according to claim 1, wherein the liquefied $CO_2$ stream removed in step d) is used in a conversion process, sequestration or transport, after optional storage and pumping.

8. The method according to claim 1, wherein the $CO_2$-containing stream has a $CO_2$ content in the range of from 100 to 1000 ppmv.

9. The method according to claim 1, wherein the first $CO_2$-enriched stream obtained in step b) has a $CO_2$ content (excluding water) of at least 80 vol. %.

10. The method according to claim 1, wherein the first $CO_2$-enriched stream obtained in step b) has a $CO_2$ content (excluding water) of at least 90 vol. %.

11. The method according to claim 1, wherein the first $CO_2$-enriched stream obtained in step b) has a pressure of from 0.9 to 1.1 bara.

12. The method according to claim 4, wherein the second $CO_2$-enriched stream has a $CO_2$ content (excluding water) of at least 95 vol. %.

* * * * *